United States Patent
Judd et al.

(10) Patent No.: US 12,321,533 B1
(45) Date of Patent: Jun. 3, 2025

(54) HANDSETS FOR CONTROLLING INFLIGHT ENTERTAINMENT SYSTEMS

(71) Applicant: Thales Avionics, Inc., Irvine, CA (US)

(72) Inventors: Kevin Judd, Irvine, CA (US); Bipin Bopaliya, Irvine, CA (US); Raghunath Gunti, Irvine, CA (US); Ton Do, Corona, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 18/525,780

(22) Filed: Nov. 30, 2023

(51) Int. Cl.
*G06F 3/023* (2006.01)
*G06F 3/01* (2006.01)
*H05B 47/175* (2020.01)

(52) U.S. Cl.
CPC .............. *G06F 3/023* (2013.01); *G06F 3/012* (2013.01); *G06F 3/013* (2013.01); *H05B 47/196* (2024.01)

(58) Field of Classification Search
CPC .......... G06F 3/023; G06F 3/012; G06F 3/013; G06F 3/0202; G06F 3/0219; G06F 3/0482; G06F 3/044; G06F 3/0221; G06F 3/0236; G06F 3/0238; B64D 11/0015; B64D 11/00155; B64D 11/06; H05B 47/196
See application file for complete search history.

(56) References Cited

U.S. PATENT DOCUMENTS

| | | | | |
|---|---|---|---|---|
| 2010/0253230 | A1* | 10/2010 | Foreman | H01H 9/182 315/153 |
| 2011/0019106 | A1* | 1/2011 | Kimura | G08C 17/02 348/734 |
| 2013/0066526 | A1* | 3/2013 | Mondragon | B64D 47/08 701/49 |
| 2016/0378199 | A1* | 12/2016 | Sizelove | G06F 3/0202 235/449 |
| 2017/0073074 | A1* | 3/2017 | Gagnon | B60Q 3/44 |
| 2017/0123492 | A1* | 5/2017 | Marggraff | G06F 3/04845 |
| 2018/0367139 | A1* | 12/2018 | Pribisic | H03K 17/9622 |
| 2020/0019304 | A1* | 1/2020 | Mead | H03K 17/9622 |
| 2022/0055751 | A1* | 2/2022 | Hansson | B64D 11/0624 |

* cited by examiner

*Primary Examiner* — Hong Zhou
(74) *Attorney, Agent, or Firm* — Sage Patent Group (57) ABSTRACT

A handset device controls a vehicle entertainment system. The handset device includes an interface configured to communicate control signaling to the entertainment system, user selectable interface elements, light devices arranged to form light zones providing backlighting to corresponding groups of one or more of the user selectable interface elements, and controller circuitry. The controller circuitry is configured to respond to user selections among the user selectable interface elements by triggering corresponding control signaling to be communicated through the interface. The controller circuitry determines a lighting setting to select one of the light zones to activate to backlight the corresponding group of the one or more of the user selectable interface elements, and controls power flow to at least one light device in the selected light zone based on the light setting to backlight the corresponding group of the one or more of the user selectable interface elements.

17 Claims, 4 Drawing Sheets

HANDSETS FOR CONTROLLING INFLIGHT ENTERTAINMENT SYSTEMS

TECHNICAL FIELD

The present disclosure relates to inflight entertainment systems and, more particularly, to handset devices operated by users to control communicatively connected inflight entertainment systems.

BACKGROUND

Aircraft cabins have long posed challenges related to excessive light pollution caused by the back lighting of handsets. In the context of overnight flights, this issue has significantly impacted passengers' comfort and ability to rest. The conventional approach to handset lighting, characterized by a global control system, fails to address the specific needs of passengers and often results in disturbances during long-haul journeys. The necessity for some level of illumination to facilitate the location and use of handsets, especially when stowed, has highlighted the urgency for a more nuanced and targeted approach to controlling cabin lighting.

Airlines consistently strive to create a conducive environment for passengers, one that promotes relaxation and rest during extended flights. However, the indiscriminate distribution of light across all handset buttons, without considering the varying importance of their functions, has remained a persistent challenge. Passengers, particularly those unfamiliar with the handset's layout, often encounter difficulties in efficiently locating and utilizing the desired functions, thereby leading to frustration and a suboptimal travel experience.

The need for a comprehensive solution that not only addresses the issue of light pollution but also enhances the overall usability and aesthetics of the handset within the cabin environment has become increasingly apparent. The potential to integrate innovative technologies and design principles that enable a more customized and efficient control of handset lighting represents a significant opportunity to enhance the in-flight experience for passengers and mitigate the adverse effects of light pollution on their comfort and well-being.

SUMMARY

A handset device controls an entertainment system within a vehicle. The handset device includes an interface configured to communicate control signaling to the entertainment system, a plurality of user selectable interface elements, a plurality of light devices arranged to form light zones providing backlighting to corresponding groups of one or more of the user selectable interface elements, and controller circuitry. The controller circuitry is configured to respond to user selections among the user selectable interface elements by triggering corresponding control signaling to be communicated through the interface to control the entertainment system. The controller circuitry determines a lighting setting to select one of the light zones to activate to backlight the corresponding group of the one or more of the user selectable interface elements, and controls power flow to at least one light device in the selected light zone based on the light setting to backlight the corresponding group of the one or more of the user selectable interface elements.

Other handset devices and related methods and computer program products according to embodiments of the present disclosure will be or become apparent to one with skill in the art upon review of the following drawings and detailed description. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of aspects of the invention. However, it will be understood by those skilled in the art that the present invention may be practiced without these specific details. In other instances, well-known methods, procedures, components and circuits have not been described in detail so as not to obscure the present invention.

Although various embodiments are explained herein in the context of use of a handset device to control entertainment systems in an aircraft, other embodiments are not limited thereto and may be used with other types of vehicles, including, without limitation, ships (e.g., cruise ships), buses, and trains. A non-limiting example entertainment system includes a seat display unit which can be mounted to a seatback, armrest, or other location to display content (e.g., movies, television programming, gaming, etc.) and stream audio (e.g., via a headset jack and/or wireless interface such as Bluetooth). An example entertainment system is described further below with regard to FIG. 5.

Figure 1:
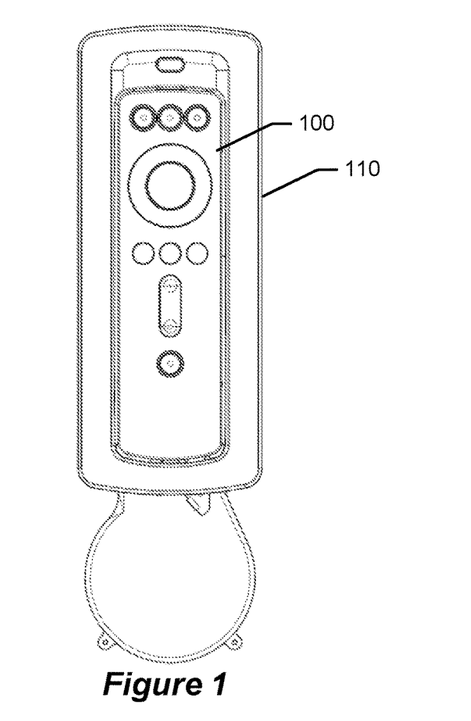
FIG. 1 illustrates an example of a handset device secured in a handset cradle in accordance with some embodiments.

FIG. 1 illustrates an example of a handset device 100 secured for storage in a handset cradle 110 in accordance with some embodiments. The handset device 100 has a plurality of user selectable interface elements, e.g., buttons in various shapes. The various user selectable interface elements are backlit by light devices, such as light emitting diodes (LEDs). As will be explained in further detail below, the light devices are arranged to form light zones providing backlighting to corresponding groups of one or more of the user selectable interface elements.

Figure 3:
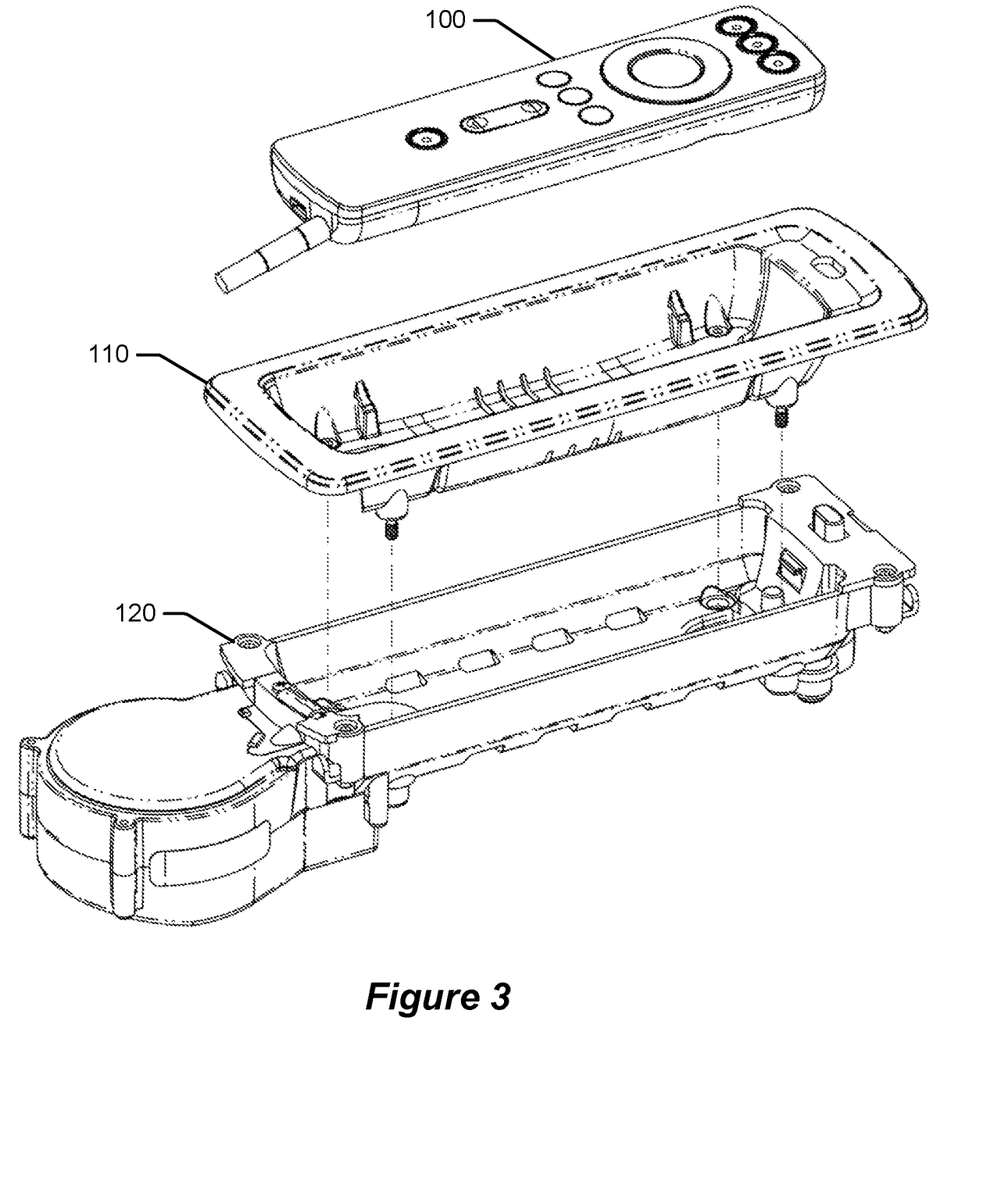
FIG. 3 illustrates an exploded view of the example handset device and handset cradle in accordance with some embodiments.

FIG. 3 illustrates an exploded view of the example handset device 100 and handset cradle 110 which is attached to a mounting device 120 in accordance with some embodiments. The handset device 100 can be removed from the handset cradle 110 and remain communicatively connected to an entertainment system via a cable that is extendable from a tether retractor which is part of the mounting device 120. The mounting device 120 may be mounted to a seat surface (e.g., seatback, armrest, seating cubicle surface, bulkhead, etc.) to securely store the handset device 100 while not being held by a passenger.

As will be explained in further detail below, controller circuitry (e.g., in the handset device 100) is configured to respond to user selections among the user selectable interface elements by triggering corresponding control signaling to be communicated through the interface to control the entertainment system. The controller circuitry determines a lighting setting to select one of the light zones to activate to backlight the corresponding group of the one or more of the user selectable interface elements. The controller circuitry responsively controls power flow to at least one light device in the selected one of the light zones based on the light setting to backlight the corresponding group of the one or more of the user selectable interface elements.

Although various embodiments are explained herein in the context of the controller circuitry residing within the handset device 100, some or all of the controller circuitry may reside in the entertainment system, e.g., as part of the circuitry which operates a seat video display unit. Accordingly, the term controller circuitry can refer to only circuitry which resides in the device configured to be held by a passenger to remotely control the entertainment system, or may additionally refer to circuitry residing in the entertainment system which communicates with circuitry in the handset device 100. Also, the term "handset" is not limited to being configured for being held in a passenger's hand, but moreover includes other types of user interface device having user selectable interface elements which are selectable by a passenger's hand but where the device is not configured to be handheld.

In current aircraft cabins, the issue of excessive light pollution caused by handset back lighting has been a persistent concern for passengers, particularly during overnight flights. This excess illumination, necessary for locating and using the device in dimly lit cabins, often disrupts passengers' rest and relaxation. By implementing a design that enables individual control of light zones of the handset, this solution seeks to significantly reduce cabin light pollution. Moreover, it allows for the prioritization of essential functions by assigning higher light values, thus emphasizing their significance over other functions. Furthermore, the flexibility in adjusting lighting aesthetics ensures seamless integration with various interior design themes.

However, the existing global control of handset lighting exacerbates the issue of light pollution, as all buttons are uniformly illuminated without regard for the importance of their functions. Given the airlines' aim to create a more sleep-friendly environment for passengers during long flights, minimizing unnecessary light emission becomes crucial. Notably, passengers, especially those unfamiliar with the handset, often face difficulties in locating desired functions, particularly when navigating the Personal Service System (PSS) features such as calling the attendant or adjusting the reading light.

The current practice of globally controlling handset lighting fails to address the issue of light pollution effectively. Given the uniform illumination of all buttons at the same level, critical functions lack the necessary priority, contributing to heightened disturbances for passengers during their journey. Although some illumination is necessary for passengers to locate and use the handset when stowed, the excessive and indiscriminate use of light undermines the overall cabin ambiance, hindering the passengers' travel experience.

Figure 2:
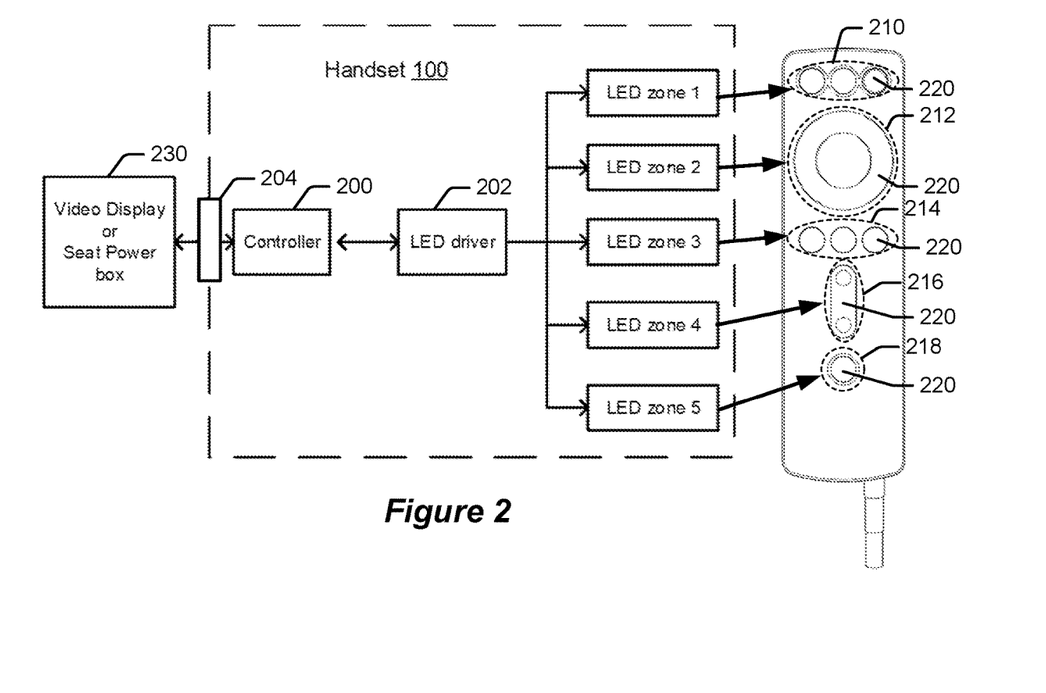
FIG. 2 illustrates a simplified system block diagram of an example handset device with light zones in accordance with some embodiments.

FIG. 2 illustrates a simplified system block diagram of an example handset device with light zones, in accordance with some embodiments. In FIG. 2, a controller controls lighting drivers to activate, deactivate, or control brightness of specific lighting zones of the handset. FIG. 2 shows LEDs being used. However, any light device may be used in the handset.

As illustrated in FIG. 2, the handset 100 has light devices, e.g., LEDs, arranged to form light zones 210, 212, 214, 216, 218, e.g., zones 1 to 5, providing backlighting to corresponding groups of one or more of the user selectable interface elements 220. Controller circuitry 200 ("controller" for brevity) is configured to respond to user selections among the user selectable interface elements by triggering corresponding control signaling to be communicated through an interface 204 to control an entertainment system 230 having a video display. Communications between the handset device and the video display may pass through a seat power box or other seat electronics box.

The controller 200 determines a lighting setting to select one of the light zones to activate to backlight the corresponding group of the one or more of the user selectable interface elements. The controller 200 controls, e.g., via a LED driver circuit 202, power flow to at least one light device in the selected one of the light zones based on the light setting to backlight the corresponding group of the one or more of the user selectable interface elements.

The controller may include a processor and memory or programmable application specific integrated circuit which can be configured, e.g., via downloadable software, to allow the independent setting of how the controller 200 controls the plurality of light zones to provide customization for particular aircraft configurations and/or for a customer specific basis.

To address various issues with globally controlled handset lighting, various embodiments incorporate a custom code block that allows airlines to personalize the light settings for each lighting zone, in order to facilitate tailored control over handset lighting. The custom code block may be used to configure and transmit personalization selections or preferences for settings of the light zones to the handset device. This adaptable configuration enables the storage of customized light preferences in an airline-specific database (e.g., information repository in non-volatile memory), which can then be seamlessly downloaded onto the handsets aboard the aircraft. The core code may remain uniform across all passengers, ensuring consistency, while the customization in the database allows for individualized settings pursuant to each airline's requirements.

By integrating downloadable software code and a segmented board design with independent control circuits for each LED zone, these embodiments enable airlines to specify the behavior of active and idle light levels for each zone on the handset. Significantly, this individual control capability for each zone enables airlines to have flexibility to fine-tune lighting preferences, creating a more tailored ambient lighting experience for passengers. Notably, this approach not only curbs cabin light pollution but also enhances the navigation and usability of the handset, even when it is stowed in the handset cradle.

Further Innovations and Conceptual Enhancements

Additional embodiments are directed to operations for determining the lighting setting which controls backlighting provided by the light zones for the user selectable interface elements. Firstly, the potential implementation of a sequential lighting strategy can guide passengers effectively, brightening specific zones in a defined sequence to facilitate the logical progression of button selection. This dynamic illumination approach ensures that passengers can easily identify and navigate through various functions, optimizing their overall interaction with the handset.

In these embodiments, two or more of the zones or particular areas of handset can be lit or brightened in a defined sequence to guide the passenger to a first zone(s)/area(s) of user selectable buttons that are most likely to be of interest to the user first (or which should operationally be selected first by the user). An example can be that lighting for the power-on button is made brightest first, and once the power-on button is selected it can be dimmed (or turned off) and another zone/area of lighting for menu navigation buttons (e.g., menu selection and backward return buttons, and/or right-left buttons and/or up-down buttons and menu item selection button) can next be brightened or turned on. Once the user has navigated to and selected a menu item, then the zones associated with channel up/down and volume up/down buttons can be brightened/turned-on and the other previous step zone(s) can be dimmed/turned-off. In this way the zonal lighting can be sequenced through alternating brightening and then darkening cycles to help guide a user to find and select buttons on the handset that are associated with different logical sequential states for starting-up the entertainment system, navigating through and selecting content which is available through the entertainment system, and then changing streamed audio volume or moving forward/back/pause while viewing displayed content.

Moreover, in some embodiments, the incorporation of zone-based proximity sensors within the handset housing creates an opportunity to enhance passenger experience. By enabling responsive adjustments in lighting (e.g., turning on/off or adjusting brightness) based on the passenger's proximity, this advanced configuration can further streamline and personalize the interaction process, adding a layer of intuitiveness and user-friendliness to the overall design.

Figure 4:
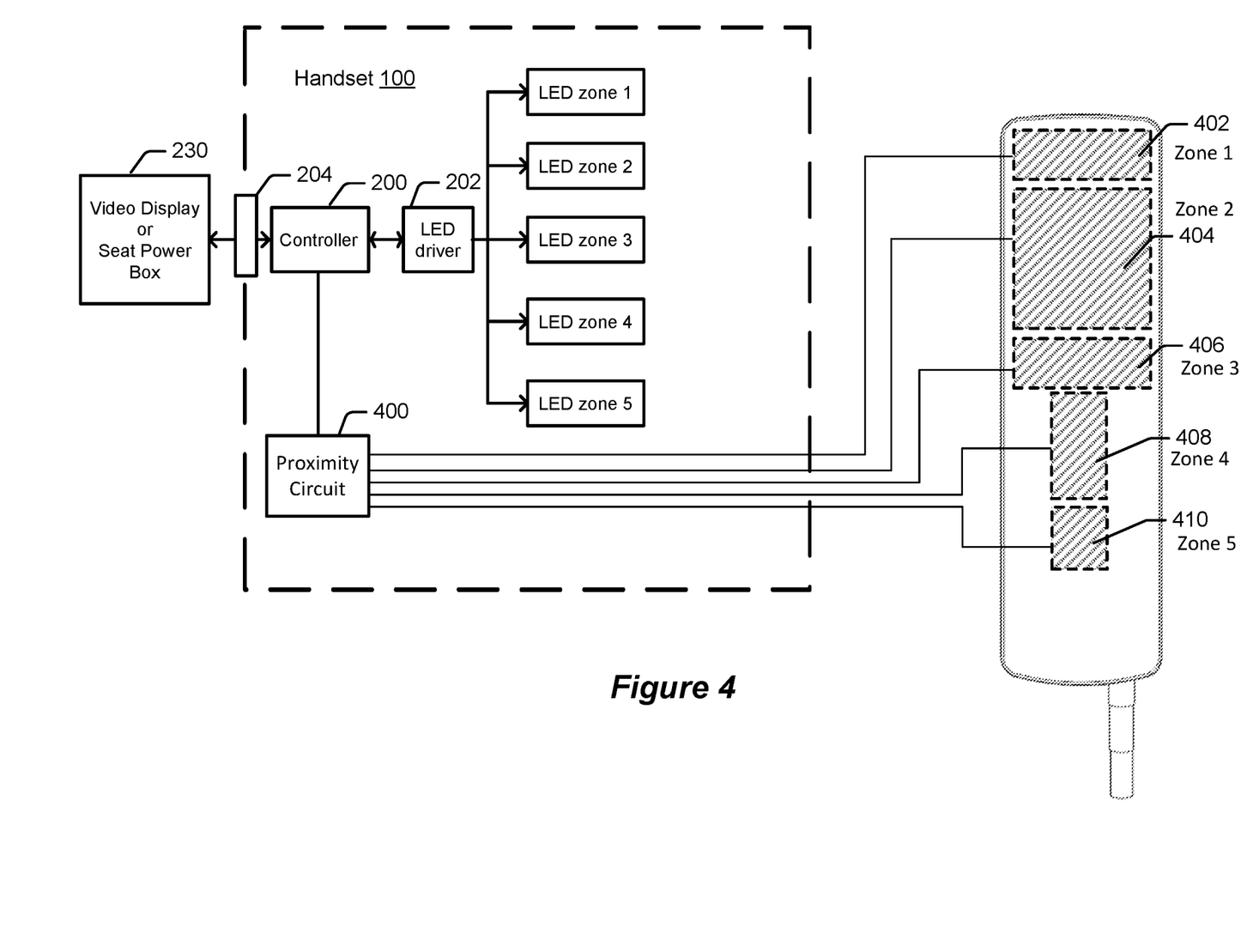
FIG. 4 illustrates a simplified system block diagram of an example handset device with a proximity sensing circuit in accordance with some embodiments.

FIG. 4 illustrates a simplified system block diagram of another example of the handset device 100 of FIG. 4 which includes a proximity circuit 400 (also called proximity sensor) configured to operate in accordance with some embodiments. A plurality of conductive plates 402, 404, 406, 408, 410 are each positioned within one of the light zones. For example, conductive plates 402-410 are illustrated as corresponding to light Zones 1 to 5, respectively. The proximity circuit 400 is electrically coupled to separately drive each of the conductive plates and configured to sense capacitive coupling and/or inductive coupling between respective ones of the conductive plates 402-410 and a passenger's finger which is proximately located to that conductive plate. The controller 200 is further configured to determine the lighting setting to activate one of the light zones (e.g., one of Zones 1 to 5) responsive to the proximity circuit 400 sensing the capacitive coupling and/or inductive coupling between the corresponding conductive plate in the light zone and the passenger's finger which is proximately located to the conductive plate.

These embodiments may thereby operate to provide zone-based proximity sensors within the handset housing that can sense a passenger's finger/hand becoming proximately located to a zone proximity sensor and responsively brightening/turning-on lighting for that zone, while dimming/turning-off other zone(s) that are no longer indicated to be proximately located to the passenger's finger. This configuration could have a conductive plate that is divided into electrically isolated charge-plate areas (conductive plates) that are inside the handset housing and with each charge-plate area (conductive plate) being associated with a zone of lighting which is selectively brightened/turned-on responsive to detecting at least a threshold level of capacitive coupling between charge on the respective one of the charge-plate area and a passenger's finger. The proximity circuit 400 electrically charges each of the charge-plate areas, and measures change in capacitive coupling between individual ones of the charge-plate areas and an external object (passenger finger). In this manner, a passenger can hover a finger over different areas of the handset to trigger backlighting (of a respective one of the light zones) to brighten under corresponding proximate areas of the handset. The brightening/turning-on of the lighting (light zone) can following the passenger's finger as it hovers over while moving around the handset, without necessarily contacting any one of the buttons, and the dimming/turning-off of the lighting (light zone) can similarly track the passenger's finger as it moves to other areas ((light zones) of the handset.

Some other embodiments are directed to activation of defined light zones or triggering lighting settings based on various other types of sensors.

The controller 200 may be further configured to determine the lighting setting based on a power status of a display unit of the entertainment system, wherein when the power status indicates that the display unit (display screen) is off the lighting setting activates the one or more light devices in one of the light zones which backlights a power-on user selectable interface element causing the controller 200 to signal the entertainment system to power-on or wake-up the display unit.

The controller 200 may be further configured to determine the lighting setting based on signaling from the entertainment system indicating type of content being displayed on a display unit of the entertainment system, wherein the controller 200 determines different lighting settings responsive to different types of content being displayed on the display unit.

The controller 200 may be further configured to determine the lighting setting based on signaling from the entertainment system indicating position of a passenger seat or indicating change of position of the passenger seat. A sensor may be included in the seat to sense recline angle and/or the sensor may include a camera which can observe seat recline angle.

The controller 200 may be further configured to determine the lighting setting based on signaling from the entertainment system indicating whether a pressure sensor in a passenger seat senses a passenger seat is occupied.

The controller 200 may be further configured to determine the lighting setting based on based on signaling from the entertainment system indicating occurrence of a public service announcement status.

The controller 200 may be further configured to determine the lighting setting based on signaling from the entertainment system indicating position of a window shade position or a change in position of the window shade, wherein the controller circuitry determines different lighting settings responsive to whether the window shade is open or closed.

The controller 200 may be further configured to determine the lighting setting based on signaling from a sensor indicating whether the handset device is secured in a handset cradle, wherein the controller circuitry determines different lighting settings responsive to whether the handset device is secured in the handset cradle.

The controller 200 may be further configured to determine the lighting setting based on signaling from the entertainment system, using an eye tracking camera, indicating whether and/or where a passenger's eye is looking toward the handset device and/or a display unit controlled by the entertainment system.

The tracking camera may include an infrared device or any optical sensing device.

The controller 200 may be further configured to determine the lighting setting based on signaling from the entertainment system, using a tracking camera, indicating location of a passenger's hand relative to the handset device and/or a display unit controlled by the entertainment system.

The controller 200 may be further configured to determine the lighting setting based on signaling from the entertainment system, using a tracking camera, indicating orientation of a passenger's head, wherein the controller circuitry determines different lighting settings responsive to whether the passenger's head is oriented toward the handset device and/or a display unit controlled by the entertainment system.

The controller 200 may be further configured to determine the lighting setting based on a determination whether a passenger electronic device is wirelessly connected to the entertainment system.

Figure 5:
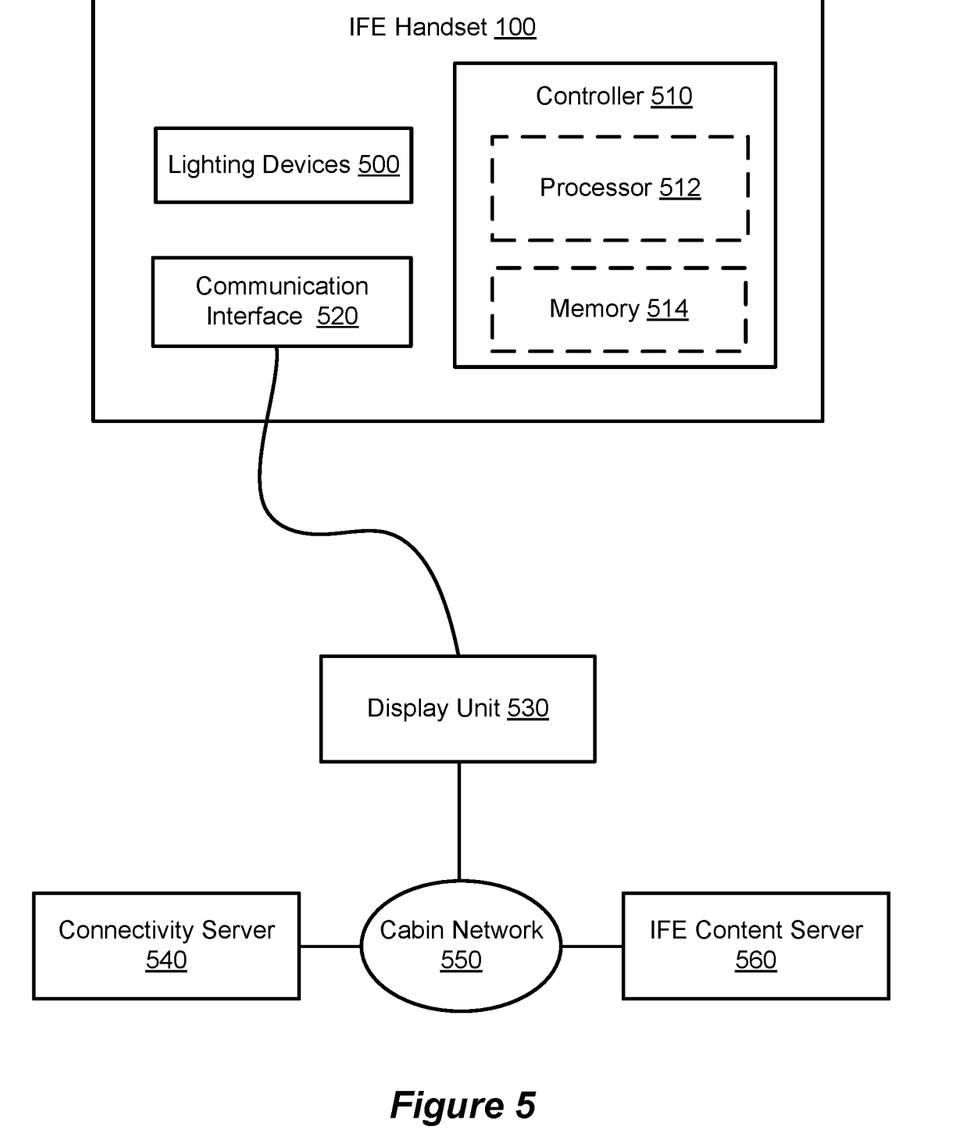
FIG. 5 illustrates a simplified system block diagram of an example handset device communicatively connected to control a display unit of an entertainment system, in accordance with some embodiments.

FIG. 5 illustrates a simplified system block diagram of an example handset device communicatively connected with a display unit, in accordance with some embodiments.

Referring to FIG. 5, the handset 100 (e.g., inflight entertainment system controlling handset) includes lighting devices 500 (e.g., light emitting diodes, etc.), the interface 204, and the controller which may include a processor 512 which executes instructions stored in memory 514 and/or includes an application specific integrated circuit. The controller 200 communicates through the interface 204 and a wired cord or a wireless communication interface with the entertainment system which includes a display unit 530 that communicates via a cabin network 550 with a content server 560, which may communicate with a connectivity server 540 configured to communicate via a satellite and/or terrestrial network with ground based content servers. A passenger can use the handset 100 to control what content is played via the content server 560 on the display unit 530, to browse the Internet via the connectivity server 540, to request services or assistance from the crew, etc.

Further Definitions and Embodiments

In the above description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random-access memory (RAM) circuit, a read-only memory (ROM) circuit, an erasable programmable read-only memory (EPROM or Flash memory) circuit, etc.

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A handset device for controlling an entertainment system within a vehicle, the handset device comprising:
   an interface configured to communicate control signaling to the entertainment system;
   a plurality of user selectable interface elements;
   a plurality of light devices arranged to form light zones providing backlighting to corresponding groups of one or more of the user selectable interface elements; and
   controller circuitry configured to:
      respond to user selections among the user selectable interface elements by triggering corresponding control signaling to be communicated through the interface to control the entertainment system;
      determine a lighting setting to select one of the light zones to activate to backlight the corresponding group of the one or more of the user selectable interface elements; and
      control power flow to at least one light device in the selected one of the light zones based on the light setting to backlight the corresponding group of the one or more of the user selectable interface elements,
      wherein the controller circuitry configured to activate individual ones of the light zones in a defined sequence to visually guide a passenger to a corresponding sequence of the user selectable interface elements defined to be most likely of interest to the passenger for selection to transition the entertainment system through a sequence of operational steps.

2. The handset device of claim 1, wherein the controller circuitry is further configured to:
   determine the lighting setting based on relative importance of each of the plurality of light zones; and
   control power flow to the light devices in a plurality of the light zones to control relative brightness of backlighting between individual ones of the plurality of the light zones based on their relative importance, with higher brightness provided to a light zone having a higher importance than another light zone having a lower importance.

3. The handset device of claim 1, further comprising:
   a plurality of conductive plates each positioned within one of the light zones; and
   a proximity sensor electrically coupled to separately drive each of the conductive plates and configured to sense capacitive coupling and/or inductive coupling between respective ones of the conductive plates and a passenger's finger which is proximately located to that conductive plate,
   wherein the controller circuitry is further configured to determine the lighting setting to activate one of the light zones responsive to the proximity sensor sensing the capacitive coupling and/or inductive coupling between the corresponding conductive plate in the light zone and the passenger's finger which is proximately located to the conductive plate.

4. The handset device of claim 1, wherein the controller circuitry is further configured to determine the lighting setting based on signaling from the entertainment system indicating position of a passenger seat or indicating change of position of the passenger seat.

5. The handset device of claim 1, wherein the controller circuitry is further configured to determine the lighting setting based on signaling from the entertainment system indicating whether a pressure sensor in a passenger seat senses a passenger seat is occupied.

6. The handset device of claim 1, wherein the controller circuitry is further configured to determine the lighting setting based on signaling from the entertainment system indicating occurrence of a public service announcement status.

7. The handset device of claim 1, wherein the controller circuitry is further configured to determine the lighting setting based on signaling from the entertainment system indicating position of a window shade position or a change in position of the window shade, wherein the controller circuitry determines different lighting settings responsive to whether the window shade is open or closed.

8. The handset device of claim 1, wherein the controller circuitry is further configured to determine the lighting setting based on signaling from a sensor indicating whether the handset device is secured in a handset cradle, wherein the controller circuitry determines different lighting settings responsive to whether the handset device is secured in the handset cradle.

9. The handset device of claim 1, wherein the controller circuitry is further configured to determine the lighting setting based on signaling from the entertainment system, using an eye tracking camera, indicating whether and/or where a passenger's eye is looking toward the handset device and/or a display unit controlled by the entertainment system.

10. The handset device of claim 1, wherein the controller circuitry is further configured to determine the lighting setting based on signaling from the entertainment system, using a tracking camera, indicating location of a passenger's hand relative to the handset device and/or a display unit controlled by the entertainment system.

11. The handset device of claim 1, wherein the controller circuitry is further configured to determine the lighting setting based on signaling from the entertainment system, using a tracking camera, indicating orientation of a passenger's head, wherein the controller circuitry determines different lighting settings responsive to whether the passenger's head is oriented toward the handset device and/or a display unit controlled by the entertainment system.

12. The handset device of claim 1, wherein the controller circuitry is further configured to determine the lighting setting based on a determination whether a passenger electronic device is wirelessly connected to the entertainment system.

13. A handset device for controlling an entertainment system within a vehicle, the handset device comprising:
   an interface configured to communicate control signaling to the entertainment system;
   a plurality of user selectable interface elements;
   a plurality of light devices arranged to form light zones providing backlighting to corresponding groups of one or more of the user selectable interface elements; and
   controller circuitry configured to:
      respond to user selections among the user selectable interface elements by triggering corresponding control signaling to be communicated through the interface to control the entertainment system;
      determine a lighting setting to select one of the light zones to activate to backlight the corresponding group of the one or more of the user selectable interface elements;
      control power flow to at least one light device in the selected one of the light zones based on the light setting to backlight the corresponding group of the one or more of the user selectable interface elements;
      determine the lighting setting based on relative importance of each of the plurality of light zones; and
      control power flow to the light devices in a plurality of the light zones to control relative brightness of backlighting between individual ones of the plurality of the light zones based on their relative importance, with higher brightness provided to a light zone having a higher importance than another light zone having a lower importance,
   wherein the relative importance of one light zone is set higher than another light zone when a status of cabin lights is set to on.

14. A handset device for controlling an entertainment system within a vehicle, the handset device comprising:
   an interface configured to communicate control signaling to the entertainment system;
   a plurality of user selectable interface elements;
   a plurality of light devices arranged to form light zones providing backlighting to corresponding groups of one or more of the user selectable interface elements; and
   controller circuitry configured to:
      respond to user selections among the user selectable interface elements by triggering corresponding control signaling to be communicated through the interface to control the entertainment system;
      determine a lighting setting to select one of the light zones to activate to backlight the corresponding group of the one or more of the user selectable interface elements;
      control power flow to at least one light device in the selected one of the light zones based on the light setting to backlight the corresponding group of the one or more of the user selectable interface elements;
      determine the lighting setting based on relative importance of each of the plurality of light zones; and
      control power flow to the light devices in a plurality of the light zones to control relative brightness of backlighting between individual ones of the plurality of the light zones based on their relative importance, with higher brightness provided to a light zone having a higher importance than another light zone having a lower importance,
   wherein the relative importance of the light zones is set based on settings accessed by the controller circuitry via the entertainment system from a customer specific database.

15. A handset device for controlling an entertainment system within a vehicle, the handset device comprising:
   an interface configured to communicate control signaling to the entertainment system;
   a plurality of user selectable interface elements;
   a plurality of light devices arranged to form light zones providing backlighting to corresponding groups of one or more of the user selectable interface elements; and
   controller circuitry configured to:
      respond to user selections among the user selectable interface elements by triggering corresponding control signaling to be communicated through the interface to control the entertainment system;
      determine a lighting setting to select one of the light zones to activate to backlight the corresponding group of the one or more of the user selectable interface elements;
      control power flow to at least one light device in the selected one of the light zones based on the light setting to backlight the corresponding group of the one or more of the user selectable interface elements;
      determine the lighting setting based on relative importance of each of the plurality of light zones; and
      control power flow to the light devices in a plurality of the light zones to control relative brightness of backlighting between individual ones of the plurality of the light zones based on their relative importance, with higher brightness provided to a light zone having a higher importance than another light zone having a lower importance,
   wherein the relative importance of the light zones is set based on which operational state of a user interface of the entertainment system is presently being accessed by a passenger using the handset device.

16. A handset device for controlling an entertainment system within a vehicle, the handset device comprising:
   an interface configured to communicate control signaling to the entertainment system;
   a plurality of user selectable interface elements;
   a plurality of light devices arranged to form light zones providing backlighting to corresponding groups of one or more of the user selectable interface elements; and
   controller circuitry configured to:
      respond to user selections among the user selectable interface elements by triggering corresponding control signaling to be communicated through the interface to control the entertainment system;

determine a lighting setting to select one of the light zones to activate to backlight the corresponding group of the one or more of the user selectable interface elements; and control power flow to at least one light device in the selected one of the light zones based on the light setting to backlight the corresponding group of the one or more of the user selectable interface elements, wherein the controller circuitry is further configured to determine the lighting setting based on a power status of a display unit of the entertainment system, wherein when the power status indicates that the display unit is off the lighting setting activates the one or more light devices in one of the light zones which backlights a power-on user selectable interface element causing the controller circuitry to signal the entertainment system to power-on or wake-up the display unit.

17. A handset device for controlling an entertainment system within a vehicle, the handset device comprising:

an interface configured to communicate control signaling to the entertainment system;

a plurality of user selectable interface elements;

a plurality of light devices arranged to form light zones providing backlighting to corresponding groups of one or more of the user selectable interface elements; and controller circuitry configured to:

respond to user selections among the user selectable interface elements by triggering corresponding control signaling to be communicated through the interface to control the entertainment system;

determine a lighting setting to select one of the light zones to activate to backlight the corresponding group of the one or more of the user selectable interface elements; and control power flow to at least one light device in the selected one of the light zones based on the light setting to backlight the corresponding group of the one or more of the user selectable interface elements, wherein the controller circuitry is further configured to determine the lighting setting based on signaling from the entertainment system indicating type of content being displayed on a display unit of the entertainment system, wherein the controller circuitry determines different lighting settings responsive to different types of content being displayed on the display unit.

* * * * *